July 23, 1929.  A. W. LEE  1,722,003
JOINT
Filed Oct. 10, 1927  2 Sheets-Sheet 1
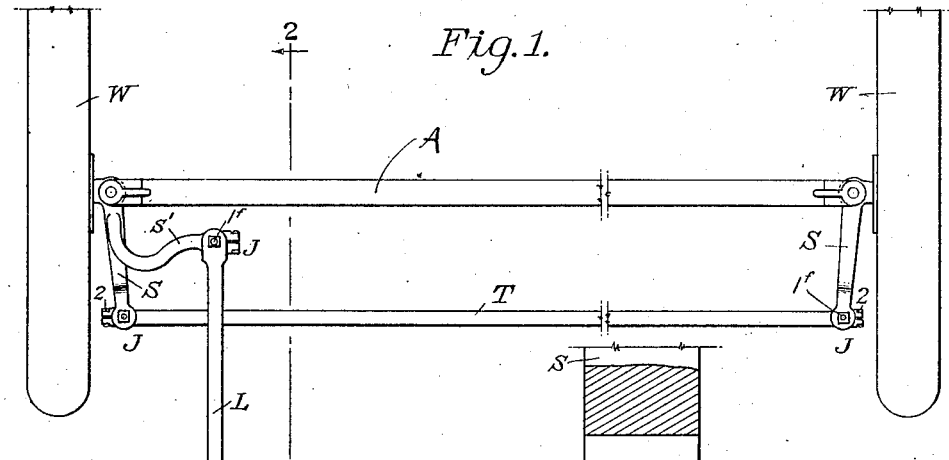
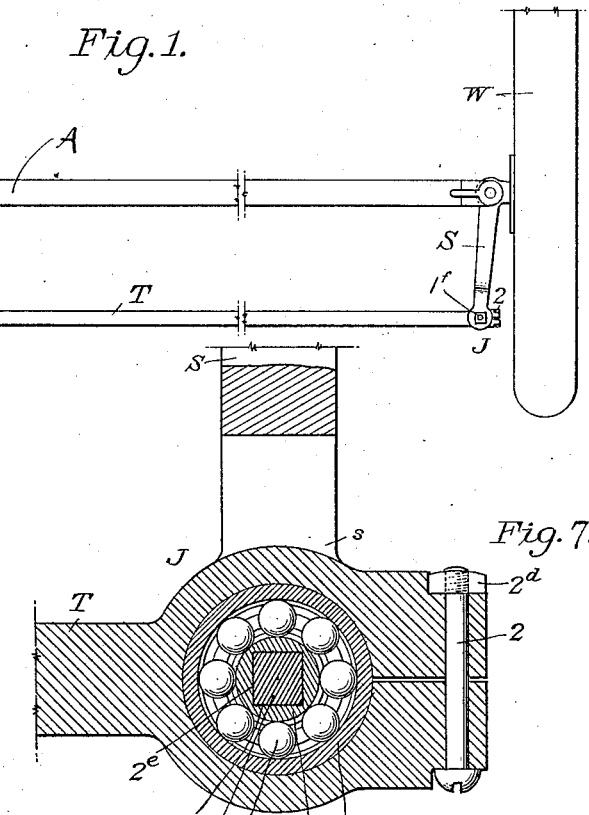
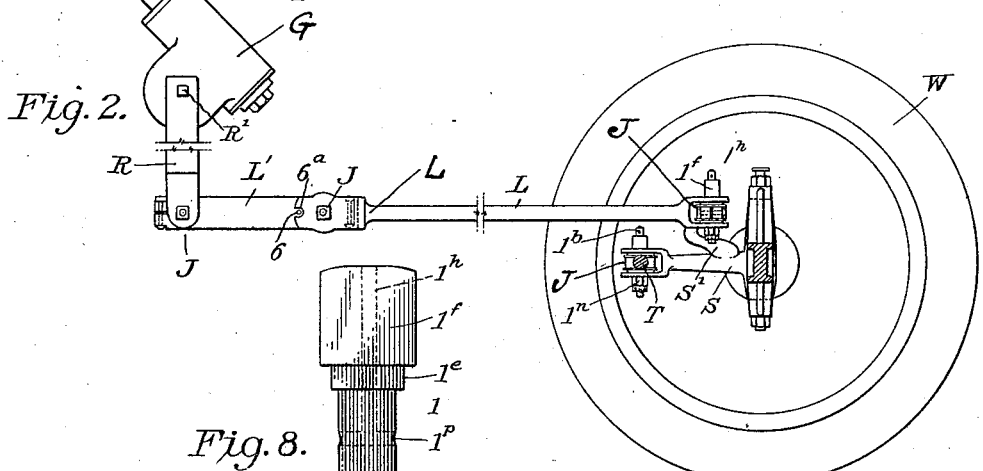
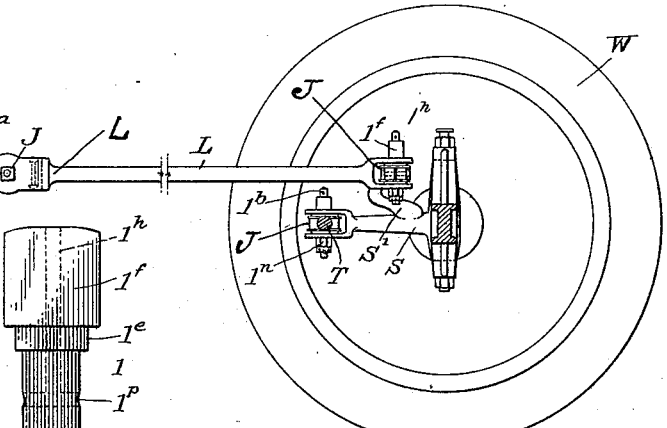
INVENTOR.
Albert W. Lee
BY
Alexander Fowler
ATTORNEYS July 23, 1929. A. W. LEE 1,722,003
JOINT
Filed Oct. 10, 1927 2 Sheets-Sheet 2

INVENTOR.
Albert W. Lee
BY
Alexander W. Lowell
ATTORNEYS

Patented July 23, 1929.

1,722,003

UNITED STATES PATENT OFFICE.

ALBERT WILLIAM LEE, OF COLUMBIA, SOUTH CAROLINA, ASSIGNOR OF FORTY-NINE PER CENT TO ARTHUR W. HAMBY, OF COLUMBIA, SOUTH CAROLINA.

JOINT.

Application filed October 10, 1927. Serial No. 225,253.

This invention is a novel improvement in joints especially designed for use on the steering gear of automobiles although useful for other purposes. The principal object of the invention is to enhance the safety of the steering mechanism of automobiles under all conditions, and to make the steering easier.

In the present automobile steering gear the joints are ordinarily ball and socket joints, and grit and other foreign matter gets into such joints and causes wear thereon, and the constant alternating pull and push on these joints while steering hastens such wear, and ultimately, unless repairs are made, the ball and socket wear so much that the ball pulls out of the socket rendering the automobile uncontrollable and frequently causes serious accidents. One of the objects of the invention is to provide a novel joint which will not be subject to wear like the ball and socket joint, and from which grit and foreign matter will be excluded, such joint being capable of indefinite use without noticeable wear.

On account of the wear on ball and socket joints, as described above, a great deal of lost motion results between the steering wheels and the steering shaft; this permits "shimmying" which renders the car uncontrollable and makes it necessary to bring the car to a stop. Another object of the present invention is to provide a joint which always remains close fitted, and by which lost motion and "shimmying" will be prevented.

Further the present ball and socket joints if not kept thoroughly greased at all times, and if worn, make steering laborious; and in soft soil extremely hard. Another object of the present invention is to provide a joint which can not bind, and which will render the steering easy at all times.

The accompanying drawings illustrate a practical embodiment of the invention as applied to the steering linkage of an automobile; and the invention will be explained in detail with reference to said drawings to enable others to understand and use the same; and the essentials of the invention and the novel features of construction and novel combinations of parts for which protection is desired are summarized in the claims.

In said drawings:

Figure 1 is a detail plan view of the connections as steering linkage between the rocker shaft and the steering wheels of a vehicle, equipped with my improved joints;

Fig. 2 is a sectional view of the line 2—2, Fig. 1 looking in the direction of the arrows;

Fig. 7 is a sectional view on the line 7—7, Fig. 4;

Fig. 8 is a view of the joint bolt detached.

In Figs. 1 and 2 of the drawings the steering wheels W are mounted as usual on steering arms S pivoted on axle A and connected by a tie rod T. One arm is provided with the usual crank arm S' connected to the drag link preferably consisting of two members L, L' connected by a joint I—the rear member L being connected to the lever R which is attached to the rocker shaft R' of the steering gear G in the usual manner, so that turning of the steering wheel (not shown) will vibrate the lever R and through the described connections shift the steering wheels in the well known manner.

My novel wear-proof and dust-proof joints are preferably used to connect the lever R with the link L', to connect the members of the drag links L, L', to connect the drag link to the crank arm S', and to connect the rod T to the steering arms S, such joints being all constructed alike, and being indicated by the letter J in Figs. 1 and 2 of the drawings. Each joint J is preferably constructed as illustrated in Figs. 3 to 8, and the description of one will explain all.

The joint comprises a bolt 1, see Fig. 8 which is fast to one of the members to be connected, and a ball bearing which is fast to the other member to be connected. Preferably the ball bearing is composed of an outer race $2^a$, an inner race $2^b$ and interposed balls $2^c$ by which the members $2^a$ and $2^b$ are kept together while free to rotate one with relation to the other.

Figure 3:
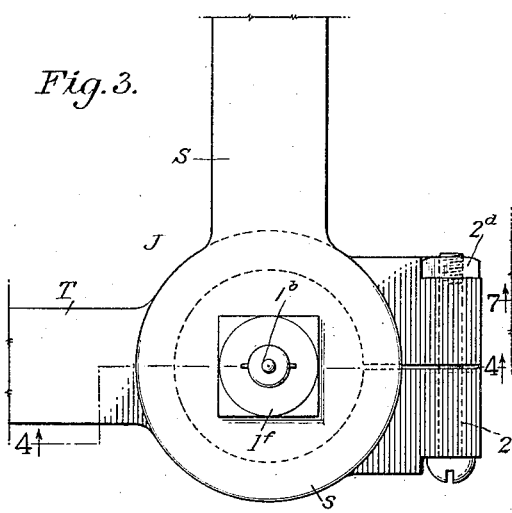
Fig. 3 is an enlarged top view of one of the novel joints.

The ball race $2^a$ is normally rotatably confined in an opening in the end of one member to be united by the joint, for instance the tie rod T, which member preferably has a split end provided with a circular recess to receive the ball bearing, the split end of the rod being clamped around the ball race $2^a$ by means of a bolt 2 and nut $2^d$, as indicated in Fig. 3.

Figure 4:
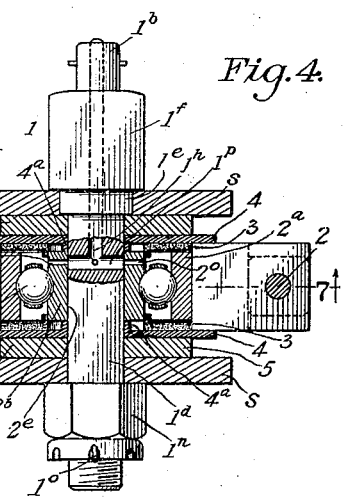
Fig. 4 is a sectional view on the line 4—4, Fig. 3.
Figure 5:
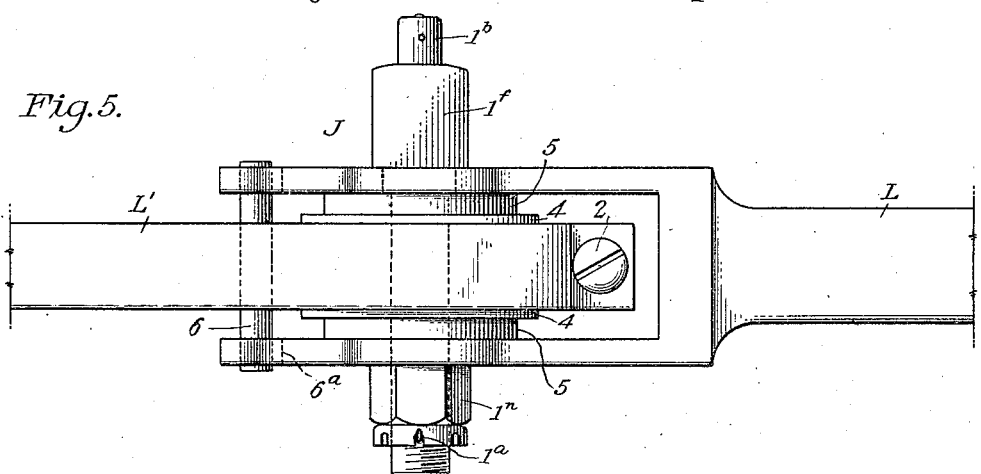
Fig. 5 is a side view of the joint as connecting the two members of the drag link.
Figure 6:
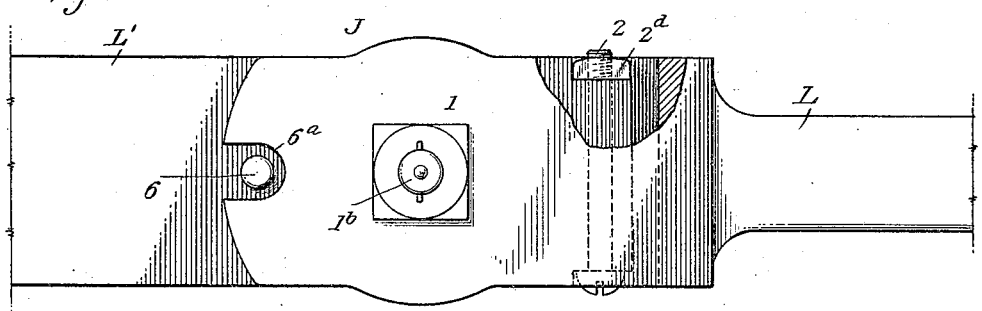
Fig. 6 is a top plan view of Fig. 5 partly broken.

The other member to be connected by the joint, for example the steering arm S, is bifurcated, as in Fig. 3, and the end of the tie rod carrying the ball bearing is inserted in the bifurcation of the tie rod as indicated in Fig. 4, and the bolt 1 is passed through the bifurcation of the tie rod and through the ball bearing.

The inner ball race $2^b$ is preferably provided with a rectangular axial opening $2^e$ adapted to engage a corresponding rectangular portion $1^d$ of the bolt 1, so that the race $2^b$ can not rotate on the bolt.

As indicated in Fig. 4 the squared portion $1^d$ of the bolt extends through a preferably square opening in the lower member $s$ of the bifurcation. The upper member $s$ of the bifurcation preferably has a somewhat larger square opening engaged by a somewhat larger squared portion $1^e$ of the bolt; the bolt has a preferably square head $1^f$ above portion $1^e$ which can be engaged by a wrench while the nut on the bolt is being turned. The lower end of the bolt is threaded; and the bolt can be securely clamped in position by means of a nut $1^n$ which when tightened may be secured by a cotter pin $1^o$.

Washers 3, preferably of felt, are placed above and below the ball bearing, these washers being fitted to the ball bearing as in Fig. 4 and will exclude grit and other foreign matters from the bearing and retain grease therein.

Above and below the felt washers 3 are adjustment washers 4 which lap over and cover the felt washers. The washers 4 preferably have rectangular openings to engage the squared portion $1^d$ of the bolt, and also preferably have flanges $4^a$ around said openings which will engage the race $2^b$ of the ball bearing and prevent washers 4 unduly binding or clamping the washers 3.

A flat washer 5 is interposed between the upper washer 4 and the upper member $s$ of the bifurcation, and a similar washer 5 is interposed between the lower washer 4 and lower member $s$ of the bifurcation. The washers 4 and 5 are of such thickness when the nut $1^n$ is tightened close contact will be made between the adjustable washers 4 and the races of the ball bearing without binding the balls or the washers 3.

Because of the relative positions of the washers 4 and 5 and the square holes therein engaging the square body of the bolt the bolt and washers 4 and 5 can not turn, but the felt washers 3 can turn. In this novel joint grease will be retained and grit and dust effectively excluded.

Each of the several joints indicated at J, Figs. 1 and 2, is preferably made as above described, and illustrated in Figs. 3, 4 and 7.

The bifurcation of the member L of the drag link (see Figs. 5 and 6) is preferably provided with recesses $6^a$ adapted to loosely engage a pin 6 attached to the member L′ of the link. The notches $6^a$ and pin 6 limit the extent of relative movement of the members L, L′, when contrasting pressure is exerted on the link. This novel joint obviates the possibility of the drag link getting out of alinement, as frequently happens when the vehicle is in motion and the body swinging or vibrating on the springs, thereby varying the distance between the steering linkage and the car body and this joint between the members L and L′ of the drag link enables the front part L of the link to remain parallel to the steering gear and keeps the front joint horizontal, thus avoiding binding of the joint connecting the drag link to the steering arm, which would occur if the link was rigid.

To provide for lubrication of the joint the bolt is provided with a bore $1^h$ which extends through the head $1^f$ and into the part $1^d$ to a point below the upper edge of the race $2^b$ of the ball bearing, when the joint is assembled. At this point the bore $1^h$ connects with a transverse hole $1^p$ in the bolt. The upper end of the bore $1^h$ may be closed by any suitable means. Preferably it is provided with a valve $1^b$, of any well known construction, so that the grease can be supplied to the joint by an alemite gun. The race $2^d$ of the ball bearing is provided with four radial holes $2^o$ (two of which are adapted to register with the bore $1^p$ in the bolt, regardless of how the bolt is inserted through the part $2^d$) so that when grease is forced into the bolt it will pass through the bores $1^h$ $1^p$ and $2^o$ into the ball bearing.

The joints can be applied to any car, regardless of the arrangement of the steering gear, and the ease with which the joints operate will render it unnecessary to have long steering arms.

The novel joints can be used on the spring supporting the body of an automobile, and will cause easier and more even riding, and will also to a great extent obviate "squeaks" when the car is in motion. The joint can also be used with advantage in connection with the foot pedals for gear shifts, or for brake levers on brake rods, and in other places and for many other purposes.

I claim:

1. In a joint, the combination of two members to be united, one of said members being bifurcated and the other member having an opening and entered in the bifurcation of the first member; a ball bearing comprising inner and outer races and intermediate balls secured within the said opening; a bolt transfixing the arms of said bifurcated member and extending through the inner race of the ball bearing, said bolt being angular in cross-section and engaging a correspondingly angular bore in the inner race; nonrotatable adjustment washers strung on the bolt between the opposite sides of the ball bearing and the bifurcation arms, and positioning the ball bearing and second member in the bifurcation; and dust-excluding washers interposed between the adjustment washers and the ball bearing.

2. In a joint as set forth in claim 1, the ends of the arms extending beyond the bolt and provided with notches, and a pin attached to the other member and engaging said notches to limit the extent of play of the joint.

3. In a joint, the combination of two members to be united, one of said members being bifurcated and the other member having an opening in its end and entered in the bifurcated end of the first member; a ball bearing comprising inner and outer races and intermediate balls secured within the said opening, and a bolt transfixing the arms of said bifurcated member and extending through the inner race of the ball bearing, said bolt being angular in cross section and engaging in a correspondingly angular bore in the inner race, said bolt and said inner race being provided with connecting passages for the admission of grease to the bearing.

4. A joint for pivotally uniting two members, comprising one member which has a bifurcation and another member which has a recess and is entered into the bifurcation, a ball bearing fitted within the recess in the one member and having inner and outer races and intermediate balls; and a bolt extending through the bifurcation and the inner ball race and connecting the inner ball race with the bifurcation arms, the ends of the bifurcation extending beyond the bolt and provided with notches, and a pin attached to the other member and engaging in said notches to limit the extent of play of the joint.

5. In a joint, the combination of two members to be united, one of said members being bifurcated and the other member having an opening in its end and entered in the bifurcated end of the first member; a ball bearing comprising inner and outer races and intermediate balls secured within the said opening, a bolt transfixing the bifurcation arms of said bifurcated member and extending through the inner race of the ball bearing, said bolt being angular in cross section, and engaging a correspondingly angular bore in the inner race, and dust excluding washers interposed between the bifurcation arms and the ball bearing, the ends of the bifurcation arms extending beyond the bolt and provided with notches, and a pin attached to the other member and engaging in said notches to limit the extent of play of the joint.

ALBERT WILLIAM LEE.